United States Patent [19]

Kappenhagen et al.

[11] 3,821,601

[45] June 28, 1974

[54] REGULATED DIMMER FOR INCANDESCENT LAMPS

[75] Inventors: George A. Kappenhagen, Itasca; James B. Tabor, Wheaton, both of Ill.

[73] Assignee: Westinghouse Electric Corporation, Pittsburgh, Pa.

[22] Filed: June 13, 1973

[21] Appl. No.: 370,134

[52] U.S. Cl.................. 315/311, 315/194, 315/291
[51] Int. Cl.............................................. G05f 1/00
[58] Field of Search ....... 328/144; 315/DIG. 4, 291, 315/311, 307, 308, 194

[56] References Cited
UNITED STATES PATENTS

| | | | |
|---|---|---|---|
| 3,648,106 | 3/1972 | Engel | 315/291 |
| 3,670,202 | 6/1972 | Paine | 315/311 |
| 3,684,919 | 8/1972 | Cramer | 315/DIG. 4 |

Primary Examiner—James W. Lawrence
Assistant Examiner—Harold A. Dixon
Attorney, Agent, or Firm—R. A. Stoltz

[57] ABSTRACT

A regulated lighting control apparatus to control RMS voltage supplied to an incandescent lamp load from an A.C. power source in response to an electrical demand signal. This apparatus utilizes a comparison between a signal which is a function of the demand signal and a signal proportional to the RMS value of the voltage across the load to control the amount of power supplied to the load. The apparatus also contains a voltage reset means to periodically restore the firing initiating capacitor to a predetermined voltage. Preferably the apparatus also senses the load current, and if the current tends to rise above the rated current of the apparatus, the comparison of the signals is modified so as to prevent the drawing of excess current.

7 Claims, 7 Drawing Figures

REGULATED DIMMER FOR INCANDESCENT LAMPS

CROSS-REFERENCE TO RELATED APPLICATION

In copending application Ser. No. 352,822, filed Apr. 19, 1973 by the present inventors and owned by the present assignee, is disclosed a dipless cross-fading circuit which, in normal cross-fading operations, provides a signal proportional to the sum of the signals on the two scene potentiometers and thereby avoids the normal dipping of signal which occurs during cross-fading.

BACKGROUND OF THE INVENTION

This invention relates to lighting systems in which the level of illumination from one or more lamps can be adjusted, such as in a stage lighting system, and more particularly to electronic dimmers which control the flow of power to the lamps to respond to a control signal.

Generally, such electronic dimmer circuits are non-regulated circuits. Such circuits typically use a shaping circuit, a ramp generator, and a firing circuit. These shaping circuits take an input signal indicative of a certain desired apparent lighting level, and (based on the approximately square log response of the human eye, the exponential relationship of lamp power-in and lamp illumination produced, and the relationship of firing time of SCR's to the RMS power delivered to the load) produce a shaping circuit output signal which, at nominal line voltage will cause the approximately linear ramp to intersect the firing level thus causing the firing circuit to initiate conduction at the appropriate time to produce the desired illumination level. Such circuits are not regulated in that the firing time is appropriate only for the nominal line voltage and changes in line voltage will significantly affect the illumination level.

The ramp generator typically runs a constant current into a capacitor to produce a linear voltage ramp. This voltage is typically reset to near zero when the firing circuit fires, and means is provided to prevent the charging of the capacitor until the line voltage passes through zero and the power-switching SCR ceases conduction. Such a system has inherent drawbacks at very low illumination levels. It is possible, for example, for the charge on the capacitor to not reach the firing level during one cycle and to accumulate for several cycles without the SCR's firing. If, when the voltage across the capacitors does reach a firing magnitude, conduction is caused for a significant portion of the cycle and the lamps will blink. Operation at low levels can thus cause the lamps to blink periodically in such system.

The shaping circuits for such dimmers have typically used the Zener diode-resistor networks to give a linear approximation of the desired shaping curve. Such circuits have inherent difficulties both in the original fabrication and in operation. In such circuits potentiometers must typically be used to compensate for the plus or minus 5 to 10 percent of variations in the Zener characteristics, thus adding costs, both in the cost of potentiometers and in the cost of calibrating the circuit. In addition, the control voltage is generally a relatively low voltage (for example 24V DC) and quite a low voltage Zeners (less than 10V) are required on the low end of the curve. Not only do all such Zeners require temperature compensation but the knee characteristics of the low voltage Zener are also notoriously inconsistent at low current and these circuits still do not produce reproducible results even with temperature compensation.

Examples of dimmer circuits in the prior art are U.S. Pat. No. 3,414,766 issued to K. H. Miller on Dec. 3, 1968 and U.S. Pat. No. 3,684,919 issued to Cramer on Aug. 15, 1972.

SUMMARY OF THE INVENTION

The lighting control apparatus (dimmer), of the instant invention, controls the RMS voltage supplied to incandescent lamps in response to an electrical demand signal. The apparatus is regulated by a voltage feedback and an RMS computing means to provide a dynamic closed-loop circuit so that line voltage changes do not produce significant changes in illumination levels. The apparatus preferably also includes a voltage reset means which operates when the voltage of the A.C. power source passes through zero and inexpensive and especially stable shaping circuit.

The apparatus comprises solid-state switching means adapted to be connected in series with the incandescent lamp-load across an A.C. power source, a firing means having an output connected to the solid-state switching means (the firing means rendering the solid-state switching means conductive when the firing means is initiated), a firing-initiating capacitor connected to the firing means (for initiating the firing means when a predetermined voltage is across the firing-initiating capacitor), means connected to the firing-initiating capacitor (for periodically adjusting the voltage across the firing-initiating capacitor to a predetermined voltage generally once each half-cycle and preferably each time the voltage of the A.C. power source passes through zero), a charging rate control circuit connected to the firing-initiating capacitor (for controlling the rate at which the firing-initiating capacitor is charged) a comparator circuit having first and second inputs and having an output connected to the charging circuit (the signal at the comparator output being effective to adjust the charging rate control circuit in response to the difference between the signals on the inputs of the comparator circuit, whereby a signal to produce the appropriate firing-initiating capacitor charging rate is developed), a shaping circuit having an output connected to the first input of the comparator circuit (the shaping circuit preferably being adapted to receive the demand signal and to generate a shaped demand-signal which is essentially proportional to the 0.5 to 0.7 power of the electrical demand signal, whereby a demand signal directly proportional to an apparent-to-the-human eye luminous intensity is converted into a shaped demand signal proportional to the RMS voltage necessary to produce that luminous intensity), an RMS computing means having an output connected to the second input of the comparator circuit, and a load-voltage sensing means having an output connected to the RMS computing means.

This apparatus controls the proportion of time during which the switching means conduct and provides the appropriate RMS voltage across the load to produce the desired luminous intensity despite changes in line voltage.

Preferably a current limiting means is included, this current limiting means being responsive to the current flowing through the load and being effective to change the value of either the shaping circuit signal or the feedback signal (or both) such that the voltage to the load is reduced and the current to the load is prevented from exceeding a predetermined value (normally the rated output of the dimmer).

BRIEF DESCRIPTION OF THE DRAWINGS

The invention can be best understood by reference to the following drawings in which.

DESCRIPTION OF THE PREFERRED EMBODIMENT

Figure 1:
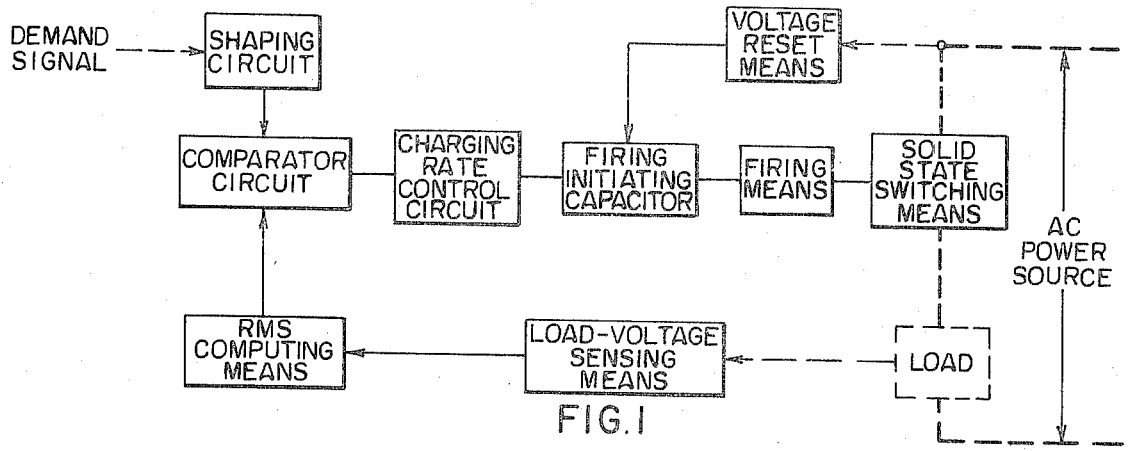
FIG. 1 is a block diagram showing the interrelationship between the elements of the instant invention.

The block diagram of FIG. 1 illustrates the interrelationship of the elements of the instant invention. The solid-state switching means is adapted to be connected in series with the load and the series combination connected across an A.C. power source. Typically such a solid-state switching means consists of a pair of SCR's (thyristors) or a single triac. The firing means has an output connected to the solid-state switching means and the firing means renders the solid-state switching means conductive when the firing means is initiated. The solid-state switching means remains conductive for the remainder of the half-cycle of the A.C. power source. The firing initiating capacitor is connected to the firing means and the voltage on the firing initiating capacitor initiates the firing means when a predetermined voltage is across the firing initiating capacitor. The voltage reset means is connected to the firing initiating capacitor. The voltage reset means adjusts the voltage across the firing initiating capacitor to a predetermined voltage (preferably each time the voltage of the A.C. power source passes through zero). Typically this predetermined voltage is near zero as produced by a transistor-resistor series combination across the capacitor (the transistor conducts to discharge the capacitor). The charging rate control circuit is connected to the firing-initiating capacitor and the charging rate control circuit controls the rate at which the firing-initiating circuit is charged. The comparator circuit has its output connected to the charging circuits and the signal at the comparator output is effective to adjust the charging rate control circuit in response to the difference between the signals on the input of the comparator circuit. This comparator output signal produces (either directly or through an amplifier) a firing-initiating-capacitor charging-rate by comparison of the RMS value of the feedback from voltage across the load and the shaped demand-signal. The shaping circuit has an output connected to one of the comparator circuit inputs and the shaping circuit is preferably adapted to receiving the electrical signal (demand signal) and generating a shaped-demand signal which is essentially proportional to the 0.5 to 0.7 power of the demand signal (for example, the shaped-demand signal can be the square root of the demand signal). Thus the demand signal which is directly proportional to a desired apparatus luminous intensity is converted into a shaped-demand signal proportional to the RMS voltage necessary to produce that apparent luminous intensity. The RMS computing means has an output connected to the other input of the comparator circuit. The load-voltage-sensing means has an output connected to the RMS computing means and the load-voltage-sensing means and the RMS computing means provide regulation such that the dimmer apparatus is generally insensitive to line voltage changes. The proportion of the time during which the solid-state switching means are conductive is controlled by the dimmer, to provide a measured RMS voltage across the load and thus the desired luminous intensity. The control is regulated as it provides the required RMS voltage across the load for all normal line voltage variations (instead of a control of the proportion of the cycle based on calculations using nominal line voltage). Typically, the load-voltage-sensing means is a transformer connected across the incandescent lamp load.

Figure 2:
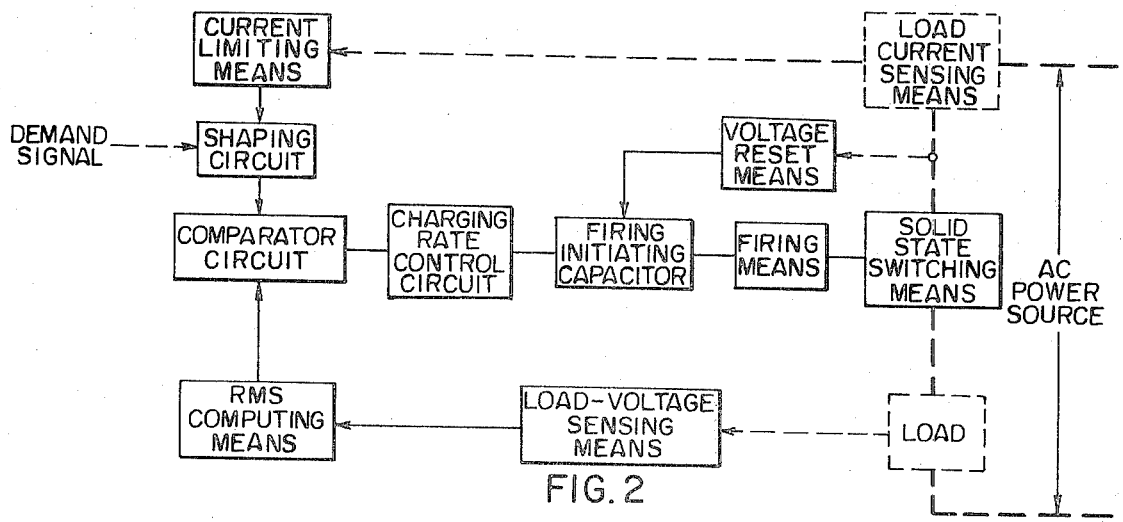
FIG. 2 is a block diagram of a preferred configuration, in which a current limiting means is included.

The block diagram in FIG. 2 illustrates a dimmer circuit utilizing a current limiting means. Here a load-current-sensing means (such as a current transformer in series with the solid-state switching means and load) senses the A.C. load current and transmits a signal to the current limiting means. The current limiting means here modifies the demand signal into the shaping circuit and thereby limits the current to the load whenver an over-current condition is sensed. Alternately, the current limiting means could be used to modify the shaped-demand signal out of the shaping circuit, or the signal into the RMS computing means. Changing the output of the comparator circuit can also be done, but this is less effective as a large error signal is developed opposing such a change. Generally the purpose of the current limiting means is to protect the solid-state switching means in the event that too great a load is inadvertently connected to the dimmer.

Figure 3:
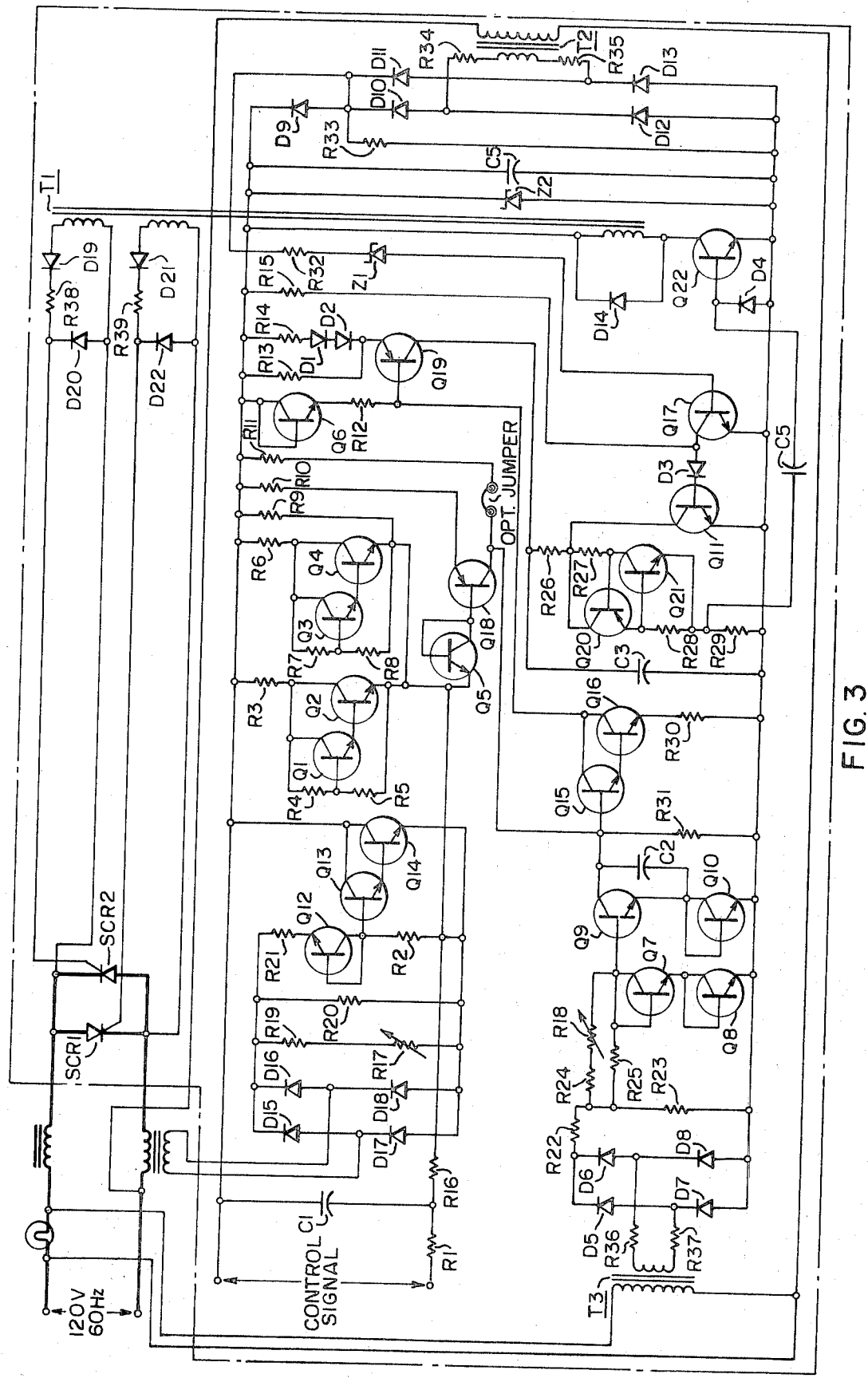
FIG. 3 is a detailed circuit diagram of a preferred configuration.

FIG. 3 is a detailed circuit diagram of a 7.2 kw dimmer illustrative of the instant invention. Table 1 is a component listing for this circuit:

TABLE 1

| Reference Identification | Component Value |
| --- | --- |
| R1, R3, R16, R33 | 10k at ¼ watt |
| R2, R25 | 160k at ¼ watt |
| R4 | 1.8 meg at ¼ watt |
| R5 | 620k at ¼ watt |
| R6, R21 | 8.2k at ¼ watt |
| R7 | 560k at ¼ watt |
| R8 | 470k at ¼ watt |
| R9 | 100k at ¼ watt |
| R10 | 20k at ¼ watt |
| R11 | 1.6 meg at ¼ watt |
| R12, R24 | 30k at ¼ watt |
| R13 | 3k at ¼ watt |
| R14 | 620 ohm at ¼ watt |
| R15, R32 | 27k at ¼ watt |
| R17 | 200 ohm pot |
| R18 | 50k ohm pot |
| R19 | 82 ohm at ¼ watt |
| R20, R29 | 330 ohm at ¼ watt |
| R22, R23 | 4.7k ¼ watt |
| R26 | 75 ohm at ¼ watt |
| R27, R28 | 47k at ¼ watt |
| R30 | 43k at ¼ watt |
| R31 | 1 meg. at ¼ watt |
| R34, R35, R36, R37 | 300 ohm at ½ watt |

TABLE 1-Continued

| Reference Identification | Component Value |
| --- | --- |
| C1 | 0.68 μfd at 100 volts |
| C2 | 5.0 μfd at 50 volts |
| C3 | 0.15 μfd at 100 volts |
| C4 | 0.33 μfd at 100 volts |
| C5 | 125 μfd at 50 volts |
| D1, D2, D3 | 1N4148 |
| D5 through D13 | 1N457A |
| D14 through D22 | 1N645A |
| Q1 through Q6 | on single chip Silicon General SG3823 |
| Q12 through Q17 | Do. |
| Q7 through Q11 | on single chip Silicon General SG3821 |
| Q18, Q19, Q20 | 2N2905A |
| Q21, Q22 | 2N711 |
| T1 | Sprague 11 Z 2100 |
| T2,3 | Stancor P-8394 |
| T4 | Johnson J-6711 |
| Z1 | 1N756A |
| Z2 | 1N968B |
| Reactor | 0.71 millihenry choke |

Figure 4:
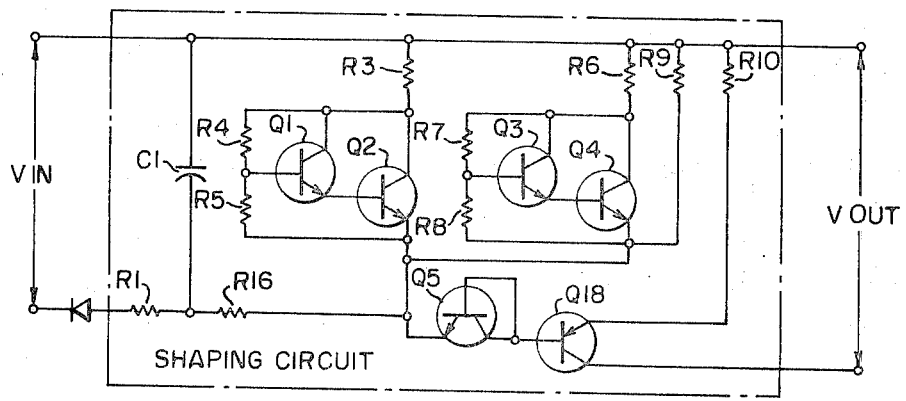
FIG. 4 is a detailed circuit diagram of a preferred configuration of the shaping circuit.

FIG. 4 is a circuit diagram showing details of the shaping circuit. It will be noted that the shaping circuit has two Darlington circuits connected generally in parallel to generate an output signal which is essentially proportional to the 0.59 power of the demand signal to compensate for the approximately square law response of the human eye and the exponential relationship between the lamp power input and the illumination produced. Typically the maximum input voltage is 24 volts D.C. and the maximum output voltage is 6 volts D.C. This circuit avoids the problems inherent in the use of Zener diodes. Zeners of the required voltage 4.05 volts, for example, have very poor "knee" characteristics near the approximately 1 milliampere operating point. The available Zeners are also not of the appropriate voltage, nor do they have close enough tolerance. The zeners of this range also have rather erratic negative characteristics which are difficult to compensate.

The Darlington transistor configuration such as formed by Q1, Q2, R4 and R5 has a predictable low current vs. voltage curve and avoids the aforementioned Zener diode problems. The instant configuration also has the advantage of using transistors of the same polarity (i.e., both npn). Q3, Q4, R7 and R8 form another predictable curve. Resistors R9, R6, and R3 form the desired slope of the transfer curve. R1 and R16 provide the series voltage dividing resistors. C1 provides noise filtering. Q18, Q5, and R10 form an output amplifier and temperature compensation. Two base-emitter drops are in all paths (from power supply plus to minus) which provides good tracking. All the active devices can be on a single integrated circuit chip to keep all devices at the same temperature. Due to output drop of 1 volt in the base-emitter junctions and the 1.1 volt drop in the external coupling diode (1N457), the equivalent of Zener points of 2.8 volts at 286 microamperes and 5.05 volts at 212 microamperes are formed. Thus the output (the shaped-demand signal) is essentially proportional to the 0.59 power of the input (demand) signal.

Figure 5:
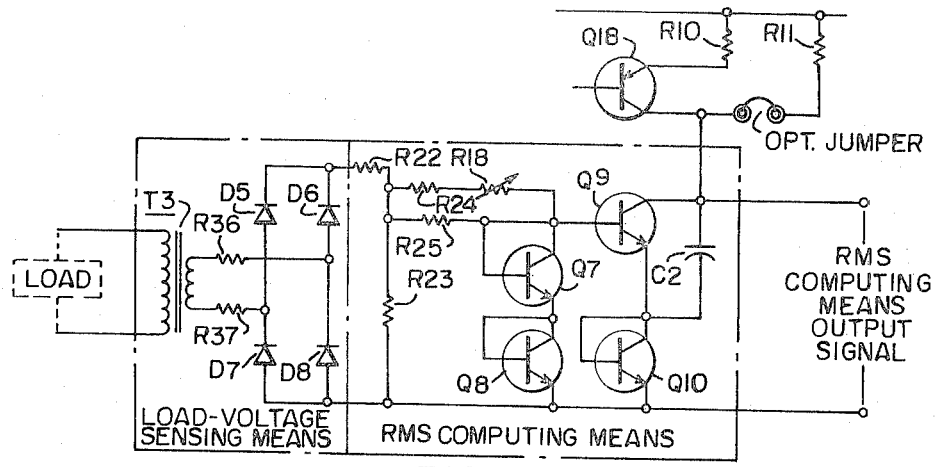
FIG. 5 is a detailed circuit diagram of a preferred configuration of the RMS computing means.

FIG. 5 provides a circuit diagram of the RMS computing means and the load-voltage sensing means. The load-voltage is sensed by transformer T3 and rectified by diodes D5, D6, D7 and D8. The proper selection of R10 will provide the desired reference value which is related properly to the D.C. control voltage value. R18, R22, R23, R24, R25 and the feedback transformer T3 provide a feedback current which can be calibrated. This current (rectified) flowing through Q7 and Q8 form a log sum voltage (the voltage is proportional to two times the log of the current to provide the squaring function of the RMS calculation). Q9 and Q10 together with C2 serve to provide one-half the analog of the log sum voltage averaged over a half cycle and thus provide a D.C. voltage proportional to the RMS voltage across the load. The operation of the RMS calculation is described in detail in allowed patent application Ser. No. 165,463, entitled "RMS Sensing Apparatus," filed July 23, 1971 by Engel, et al. R11 is an optional resistor which can be cut in to bias the dimmer to a predetermined minimum output.

Figure 6:
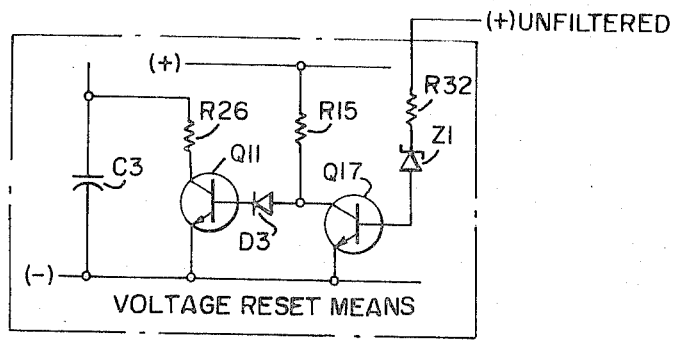
FIG. 6 is a detailed circuit diagram of a preferred configuration of the voltage reset means.

FIG. 6 illustrates a preferred configuration of the voltage reset portion of the circuit diagram. Capacitor C3 is automatically reset to near zero voltage every time the line voltage passes to zero. Resistor R32 is connected to an unfiltered full-wave rectified line signal. When the line signal is greater than the Zener voltage of Z1, Q17 is turned on and Q11 is turned off. D3 helps insure that Q11 is positively biased off. When the line signal drops below the voltage of Z1, Q17 stops conducting (as it no longer has base drive). This forces the current through R11 to drive Q11 on. Q11 shorts out C3 and the reset is accomplished. R26 limits the short circuit current to the rating of Q11. Thus it can be seen that the firing-initiating capacitor C3 is adjusted to about zero by the shorting transistor Q11 and Zener diode Z1, as when the voltage of the A.C. power source falls below a predetermined level, the shorting transistor Q11 will conduct and discharge the firing-initiating capacitor C3.

With reference again to FIG. 3 it will be noted that the output of the comparator circuit goes into a Darlington emitter-follower amplifier consisting of Q9, Q10, R31 and R30. This emitter-follower amplifier has a very constant useful gain of about 24 and the two base emitter drops match the two drops in the comparator for temperature compensation. In the normal dimming mode Q17 Q19, R12, and R13 make up another temperature compensated emitter-follower amplifier with a useful gain of 10. The output is a constant current (charging capacitor C3 in a linear ramp) if the RMS voltage across the load and the demand signal remain constant. The shunt network of D25, D26 and R14 is used to change the slope of the charging current (with respect to time) to provide output voltage limiting at maximum voltage where very fast charging times are needed for good regulation. Q20, Q21, R27, and R28 form an unusual two-transistor trigger circuit (typical circuits are a unijunction transistor). When the voltage on C3 reaches about 8 – 9 volts, the trigger circuit (firing means) turns on. A current pulse limited in magnitude and duration by R26 flows through C4 to turn on Q22. When Q22 turns on, a current pulse flows through the gates of the thyristors (SRC1 and SCR2). When the thyristors turn on, current flows through the incadescent lamp load. The thyristors turn themselves off when the lamp current returns to zero. Q22 remains on until C4 charges fully and then turns off. C4 has a discharge loop through R29 and D4 and back biases Q22 during discharge. It will be noted that the two transistor trigger firing means is less noise sensitive (especially with respect to power supply noise) as compared to a unijunction transistor trigger.

Again with reference to FIG. 3 it will be noted that T2, D10, D11, D12, D13, R33, R34, and R35 provide a Class 2 unfiltered power supply and D9, C5, and Z2 provide a filtered logic supply which is regulated to the voltage of Z2. R33 absorbs the magnetizing current of the transistor T2 so that the unfiltered waveform will return to zero each half cycle. R34 and R35 provide the current limiting required for a Class 2 system.

Figure 7:
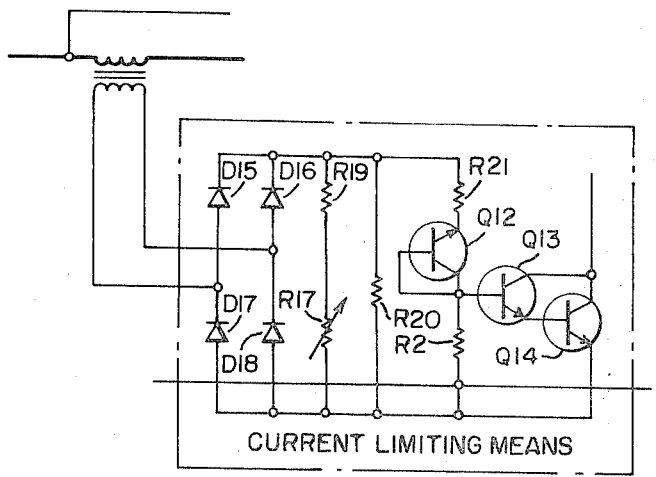
FIG. 7 is a detailed circuit diagram of the current limiting means.

The lighting control apparatus preferably also contains a current limiting means. FIG. 7 provides details of the current limiting means of the circuit diagram. The current limit is preferably placed in the input of the shaping circuit. If it is placed after the comparator, the current limit and regulating elements of the dimmer are bucking each other with poor results. In operation, the output of the current transformers is rectified by diodes D15, D16, D17 and D18. The rectified DC flows through the calibration resistor network of R17, R19, and R20 and establishes a voltage reference. When the peak reference exceeds the reverse voltage breakdown of Q12, base current flows into Q13 and Q14 (turning both of them on). When Q13 and Q14 are turned on, the dimmer control voltage drops to about 0.1 volt. This corresponds to a very low conduction angle and the resultant phase-back reduces the output current. The forward drops of Q13 and Q14 do not completely temperature compensate the reverse drop of A12, but provide a reasonable approximation thereof, depending on the particular value of the reverse drop of Q12 (normally about 5-9 volts). It can be seen that the current limiting means can be used in a similar manner to modify the signal in the RMS computing means and that the current can be limited either by lowering the apparent demand signal or raising the apparent level of the signal from the load-voltage sensing menas. Thus the current limiting means is responsive to a current flowing through the load and is effective to detect when the current exceeds a predetermined value and to modify the relative magnitude of the shaping circuit output signal (the shaped-demand signal) and the RMS computing means output signal, whereby the load current is prevented from significantly exceeding the predetermined value.

While a 0.59 power is the preferred shaping (especially for stage lighting) other shaping function can be used. Television studios commonly desire that the actual light level be directly proportional to the demand signal (rather than the square law apparent light relationship of the human eye), in which case the shaping only compensates for the exponential relationship between the lamps input voltage and light produced. Others have expressed a desire for a relationship which is between the square (second) root and the third root. By changing resistor values (or input-output terminals) any curve of power of demand signal from about zero to one can be produced.

While the invention has been explained by describing a particular embodiment thereof, it will be apparent to those skilled in the art that modification may be made without departing from the scope of the invention, by, for example, using a RMS computing means designed into an integrated circuit, or, by substituting integrated circuits operational amplifiers in other parts of the circuitry, as known in the art.

We claim:

1. A regulated lighting control apparatus responsive to an electrical demand signal to control the RMS voltage supplied to an incandescent lamp load from an A.C. power source said apparatus comprising:

a. solid-state switching means adapted to be connected in series with said load across said A.C. power source;
   b. a firing means having an output connected to said solid-state switching means which firing means renders said solid-state switching means conductive when said firing means is initiated;
   c. a firing initiating capacitor connected to said firing means for initiating said firing means when a predetermined voltage is across said firing initiating capacitor;
   d. a voltage reset means connected to said firing initiating capacitor for adjusting the voltage across said firing-initiating capacitor to a predetermined voltage;
   e. a charging rate control circuit connected to said firing initiating capacitor for controlling the rate at which said firing initiating capacitor is charged;
   f. a comparator circuit having first and second inputs and having an output connected to said charging circuit, the signal at said comparator output being effective to adjust said charging rate control circuit in response to the difference between the signals on said inputs of said comparator circuit whereby an error signal to correct the firing initiating capacitor charging rate is developed;
   g. a shaping circuit having an output connected to said first input of said comparator circuit, said shaping circuit being adapted to receiving said demand signal and to generating an output signal which is a function of said demand signal;
   h. an RMS computing means having an output connected to said second input of said comparator circuit; and
   i. a load voltage sensing means having an output connected to said RMS computing means, whereby the proportion of time during which said solid-state switching means conduct is controlled to provide RMS voltage across said load to produce the desired luminous intensity.

2. The apparatus of claim 1, wherein a current limiting means is included, said current limiting means being responsive to the current flowing through said load and being effective to detect when said current exceeds a predetermined value, and to modify the relative magnitude of said shaping circuit output signal and said RMS computing means output signal, whereby said current is prevented from significantly exceeding said predetermined value.

3. The apparatus of claim 1, wherein said function is such that said output signal is essentially proportional to the 0.5 to 0.7 power of said demand signal whereby a demand signal directly proportional to a desired apparent luminous intensity is converted into a shaped-demand signal proportional to the RMS voltage necessary to produce that apparent luminous intensity.

4. The apparatus of claim 3, wherein said shaping circuit has two Darlington circuits connected generally in parallel to generate a shaped-demand signal which is essentially proportional to the 0.59 power of said demand signal.

5. The apparatus of claim 3, wherein said voltage reset means adjusts said voltage across said firing initiating capacitor to a predetermined voltage each time the voltage of said A.C. power source passes through zero.

6. The apparatus of claim 5, wherein said predetermined voltages to which said firing initiating capacitor is adjusted is about zero and said voltage reset means has a shorting transistor and a Zener diode, which Zener diode, when the voltage of the A.C. power source falls below a predetermined level, causes said shorting transistor to conduct and discharge said firing initiating capacitor.

7. The apparatus of claim 6, wherein said firing means comprises a two-transistor trigger circuit.

* * * * *